April 3, 1951        E. A. STALKER        2,547,721
AUTOMATIC CONTROL FOR HELICOPTER ROTORS
Filed May 20, 1946        2 Sheets-Sheet 1

INVENTOR.
Edward A. Stalker
BY
Mareshal & Biebel
ATTORNEYS

April 3, 1951     E. A. STALKER     2,547,721
AUTOMATIC CONTROL FOR HELICOPTER ROTORS
Filed May 20, 1946     2 Sheets-Sheet 2

INVENTOR.
Edward A. Stalker
BY
Morschel & Biebel
ATTORNEYS

Patented Apr. 3, 1951

2,547,721

UNITED STATES PATENT OFFICE 2,547,721

AUTOMATIC CONTROL FOR HELICOPTER ROTORS

Edward A. Stalker, Bay City, Mich.

Application May 20, 1946, Serial No. 670,915

7 Claims. (Cl. 170—160.13)

This invention relates to aircraft and more particularly to aircraft sustained by rotating wings.

An object of my invention is to provide a means of stabilizing the rotor. It is another object to provide a stabilizing means whose relation to the rotor can be readily changed. A further object is to provide a control means which operates on the blades without the operating force passing through the stabilizing means. Other objects will appear from the following description, specification, the accompanying drawings, and the appended claims.

Figure 3:
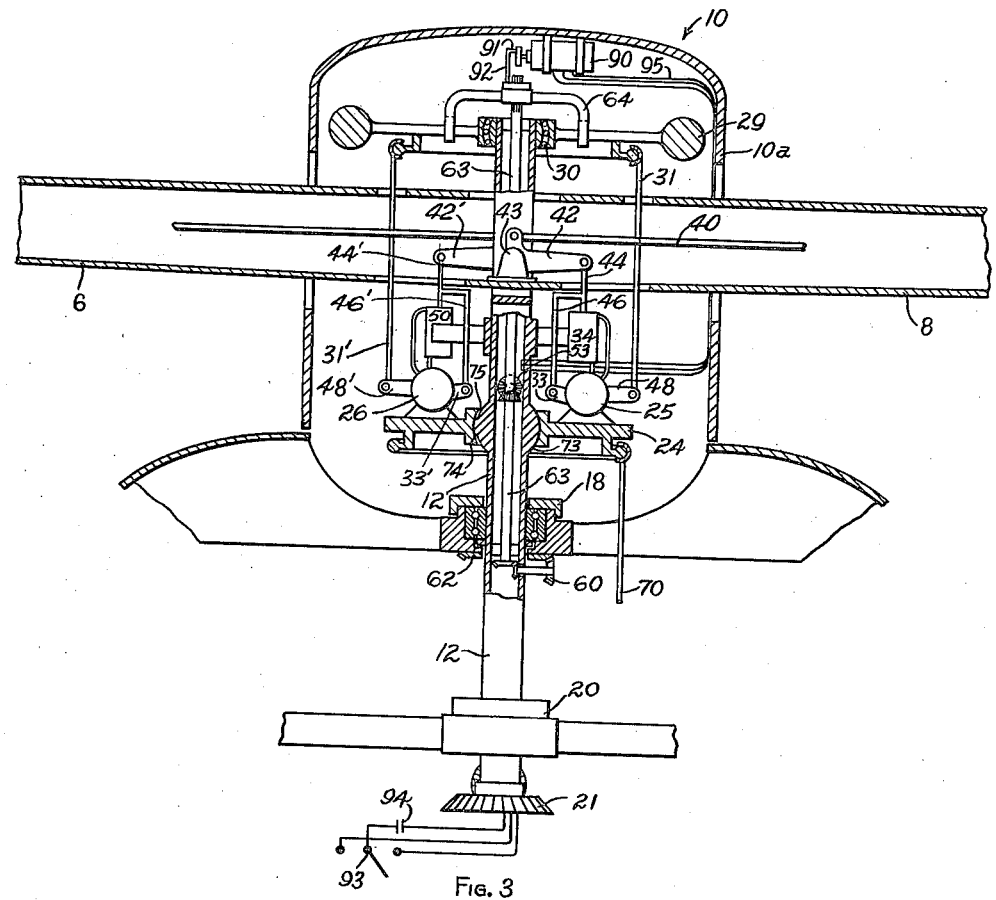
Fig. 3 is a fragmentary axial section on an enlarged scale taken along line 3—3 in Fig. 2.
Figure 1:
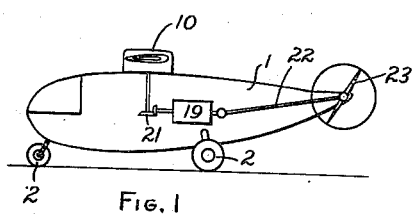
Fig. 1 is a side elevation of an aircraft in accordance with the present invention.
Figure 2:
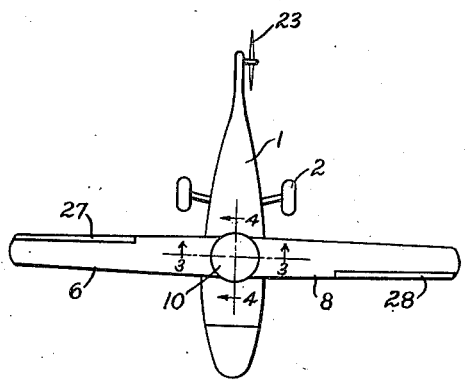
Fig. 2 is a top plan view of the aircraft.

Referring particularly to the drawings which disclose a preferred embodiment of the invention, the fuselage and landing gear of the aircraft are shown at 1 and 2 respectively. The supporting rotor is indicated generally at 4 comprising the blades 6 and 8 and hub assembly 10. In the embodiment of the invention shown, the opposite blades are joined or made integral. They are pivotally supported at the center to permit a teeter-totter or tilting motion under the action of the relative wind. This motion compensates for the lateral dissymmetry in relative wind velocity with respect to advancing and retreating blades.

The blades are supported by the shaft 12 in its yoke 14 at the upper end which receives the stub shafts 16 within bearings 17. See Figs. 3 and 4. The shaft 12 is rotatably supported in bearings 18 and 20 which are supported from the fuselage structure. The engine 19 rotates the shaft by gear train 21. A drive shaft 22 also extends from the engine to operate the usual counter-torque rotor 23.

Figure 4:
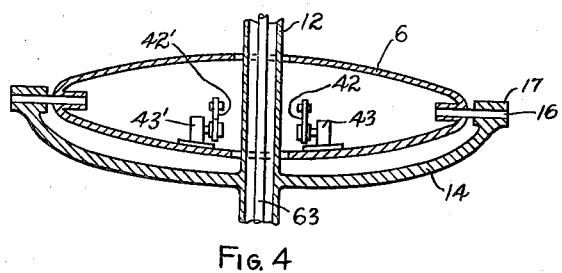
Fig. 4 is a fragmentary section at right angles to Fig. 3 taken along line 4—4 in Fig. 2.
Figure 5:
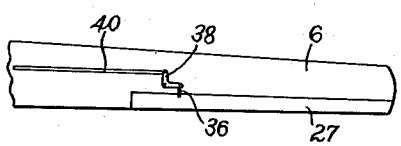
Fig. 5 is a fragmentary top view of a blade with parts being broken away to show the construction.
Figure 6:
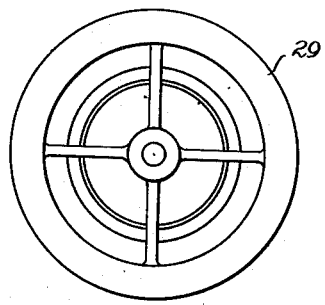
Fig. 6 is a top plan view of the gyroscope isolated from associated parts.
Figure 8:
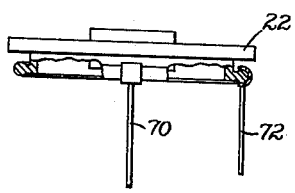
Fig. 8 is a side view of the control plate partly in section together with its control rods.
Figure 7:
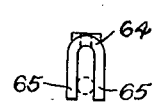
Fig. 7 is a side elevation of the driving fork shown in Fig. 3.
Figure 9:
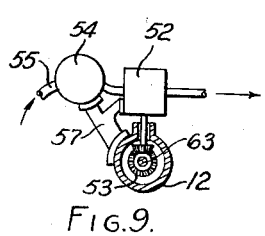
Fig. 9 is a detail sectional view through the shaft 12 showing the pump for developing the fluid pressure.

Supported on the shaft 12 is the universally mounted plate 24 which carries thereon the control devices 25 and 26. When the pilot is not actuating his control this plate has a definite attitude relative to the shaft 12 or its axis. As shown in Fig. 3 the plate is perpendicular to the shaft. The plate does, however, rotate with the shaft as will be described in detail later.

The rotor blades have the flaps 27 and 28 respectively, which are adjustable about spanwise axes to change the effective pitch of the blades and thereby to control the lifts thereof. As shown in Fig. 3 the attitudes of the flaps are controlled by the gyroscope 29 which is spun about a vertical axis. It is universally mounted on the self-aligning ball-bearing 30 so that it retains its attitude in space when the aircraft and the shaft 12 are tilted.

If a disturbing moment acts on the aircraft and it tilts laterally, the rod 31 connecting the gyroscope 29 to the power control device 25 will actuate the device and send fluid under pressure to the jack 34 which is operably connected to the blade flap 27 by means of link 36, bell crank 38, push rod 40, bell crank 42 and piston rod 44.

The bell crank 42 is supported by bracket 43 so that the axis of rotation of the bell crank is approximately in line with the axes of the stub shafts 16 and thus the tilting of the blades about axes 16 will cause at most a limited movement of the blade flaps. The piston rod 44 is also connected to the control device by cut-off rod 46 to operate as a follow up device so that when the flap has reached the angle of displacement determined by the displacement of arm 48, the rod 46 operates the control device 32 by means of arm 33 to cut off the flow of power to the jack 34.

A similar mechanism incorporating jack 50 and control device 26 operates to control flap 28 in the same manner as flap 27 is controlled, the parts carrying corresponding prime numbers. The control devices 25 and 26 are not described in detail since these are known in the art.

A suitable source of fluid pressure for operating the jacks is provided by pump 52 operated from bevelled gearing 53 driven by shaft 63. The pump is supplied from a reservoir 54 connected by feed line 55 from the discharge side of the jacks, and delivers pressure to the jacks by means of supply line 56. The assembly is carried on a suitable bracket 57 mounted on housing 12.

It will be clear, that as the aircraft tilts in any direction it will carry the control devices out of a plane parallel to the plane of rotation of the gyroscope. Then the control devices will cause movement of the flaps in such a manner as to restore the aircraft to the original attitude.

The gyroscope is spun by the gear train 60 one of whose gears meshes with bevel gear 62 fixed to the fuselage structure. As the shaft 12 is rotated, the gear train spins shaft 63 at a rate greater than that of shaft 12. The torque from shaft 63 is transmitted to the gyroscope by means of the fork 64 which is splined to shaft 63 so as to be slidable axially therealong. The prongs 65 of each fork bear slidably on the sides of the spoke of the gyroscope.

When the pilot exercises lateral control he tilts the plate 24 by means of the vertical rods 70 and 72 which are arranged at substantially 90° relative to each other and which are independently controlled. Tilting of the plate changes the positions of arms 48 relative to the gyroscope and so causes the jack to change the existing lift pattern by an increment of lift. This increment will cause a roll or pitch depending on whether the plate is tilted laterally or longitudinally. The relative position of arms 33 and 33¹ also changes relative to the piston rods 44 and 44¹ which also leads to modification of the lift. The plate 24 is mounted on the ball 73 for universal tilting but it is constrained to rotate with the ball because of a pin 74 (Fig. 3) which is fixed in the ball and projects into a vertical slot or recess 75 in the spherical hub of the plate.

Although the force required to operate the mechanism is very small, still in the course of time the gyroscope will take on a permanent displacement so that even when the aircraft is flying horizontally the gyroscope will not be spinning in a horizontal plane. Therefore means is provided for bringing the plane of rotation to the horizontal when the pilot has the aircraft in a known attitude. He will normally do this when he is able to see the horizon and thereby be prepared for the eventuality of fog or other conditions which will obscure his view.

The gyroscope is set perpendicular to shaft 63 by displacing the fork downward so that the upper end of the V between the tines 65 presses on the spokes of the gyro. The displacement is accomplished by the electric motor 90 (Fig. 3) having the crank pin 91 and connecting rod 92 articulated to the fork by means of a collar rotatably mounted on the fork. To initiate the operation the pilot simply operates reversing switch 93 so that the motor is operated by power from the source 94. The motor provides only two positions for the pin 91, that is, the motor armature turns only 180° to either the up or down position for the pin. The wires 95 pass from the motor along the hub housing 10a past the gyroscope and blade into the shaft 12 and out the bottom thereof to the switch 93 and power source 94.

This invention thus discloses means for stabilizing a rotary wing aircraft against tilting by means of an inertia element which varies the blade lift by proper increments and when the blade is in substantially the same range of azimuth positions as that in which the tilt occurred to maintain a desired attitude of the aircraft. The inertia element (gyroscope) cooperates with a servo-mechanism to relieve the element of forces which would quickly force it out of its plane of rotation. Even with the servo-mechanism the element will eventually drift from its proper plane of rotation and is provided for properly realigning the gyroscope in flight as well as on the ground. The invention also provides for the pilot control to be applied to the lift changing means without having to displace the gyroscope.

The use of stabilizing rotors has been shown in applicant's prior Patents Nos. 2,041,787 and 2,041,789. However in accordance with the present invention the control operates directly upon the rotor, rather than through the gyroscope device, this being desirable as providing for achieving more rapid movement, reducing the force required, and thus resulting in an overall improved operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in a direct lift aircraft, an inertia element having a spin axis, means supporting said element for spinning about said axis and for universal tilting movement relative to said aircraft to maintain the plane of rotation of said element in a predetermined attitude in space, means to spin said element about said axis, a blade, means for changing the lift of said blade, means supporting said blade for rotation about an upright shaft and for flapping movement about a chordwise flapping axis, a control device responsive to changes in the angular attitude of said shaft relative to said inertia element substantially in the plane including said shaft and said blade, and means operably connecting said control device to said lift changing means to vary the lift of said blade to maintain a predetermined angular relation between said shaft and the plane of rotation of said inertia element, said control device being offset from said shaft axis and positioned nearer to the vertical plane through the longitudinal axis of said blade than to a vertical reference plane through said shaft axis and perpendicular to said blade span.

2. In combination in a direct lift aircraft, a hub, a blade on said hub, means for varying the lift of said blade, means including a shaft for mounting said hub and blade for rotation about an upright axis to support the aircraft, an inertia element, means for mounting said inertia element on said aircraft for translation therewith and for complete freedom of tilting movement relative to said shaft about two axes at right angles to each other, said inertia element remaining in substantially fixed angular relation in space, power actuated means operably connected to said lift varying means for actuation thereof, a control device for sensing the tilting of said shaft relative to said element to govern the displacement of said power actuated means as a function of the tilting of said shaft relative to said inertia element leaving said inertia element substantially free of reaction forces, and means operably connecting said control device to said lift varying means to establish a predetermined lift change upon a tilting of said shaft relative to said inertia element when said blade is in substantially the same range of azimuth positions as that in which the tilt occurred.

3. In combination in a direct lift aircraft, a hub, a blade on said hub, means for varying the lift of said blade, means including a shaft for mounting said hub and blade for rotation about an axis to support the aircraft, an inertia element, means for mounting said inertia element on said aircraft for translation therewith and for complete freedom of tilting movement relative to said shaft about two axes at right angles to each other, said inertia element remaining in substantially fixed angular relation in space, power actuated means operably connected to said lift varying means for actuation thereof, a control device for sensing the tilting of said shaft relative to said element to govern the displacement of said power actuated means as a function of the tilting of said shaft relative to said inertia element leaving said element substantially free of reaction forces, means operably connecting said control device to said lift varying means to establish a predetermined lift change upon a tilting of said shaft relative to said inertia element when said blade is in substantially the same range of azimuth positions as that in which the tilt occurred, and means to adjust the relative position of said control device with respect to said shaft to superimpose a further lift change upon said blade.

4. In combination in a direct lift aircraft, a hub, a blade on said hub, means for varying the pitch of said blade, means including a shaft for mounting said hub and blade for rotation about an axis to support the aircraft, an inertia element having a spin axis, means to spin said element about said spin axis, means for mounting said inertia element for free tilting movement relative to said shaft to maintain said spin axis in a predetermined angular attitude in space, power actuated means supported on said aircraft and out of contact with said inertia element, means operably connecting said power operating means to said pitch varying means for the actuation thereof, a control device for sensing the tilting of said shaft relative to said element to govern the operation of said power actuated means as a function of the relative position of said shaft and said inertia element leaving said element substantially free of reaction forces, and means operably connecting said device to said pitch varying means to establish a predetermined pitch change of said blade upon an inclination of said shaft relative to said inertia element when said blade is in substantially the same range of azimuth positions as that in which the tilt occurred and leaving said inertia element substantially fixed in said predetermined angular attitude in space.

5. In combination in a direct lift aircraft, a hub, a pair of oppositely extending blades, means for mounting said blades on said hub for seesaw movement, means for varying the pitch of said blades, means including a shaft for mounting said hub and blades for rotation about an axis to support the aircraft, an inertia element supported for rotation about a spin axis, means supporting said inertia element for universal tilting relative to said shaft to maintain a substantially fixed angular attitude of said spin axis in space, a control device responsive to changes in the angular attitude of said shaft relative to said inertia element in the plane including said shaft and said blades, means operably connecting said control device to said pitch varying means to vary the lift of said blade to maintain a predetermined angular relation between said shaft and the plane of rotation of said inertia element.

6. In combination in a direct lift aircraft, a hub, an outwardly extending blade, means for mounting said blade on said hub for flapping movement relative thereto, means for varying the pitch of said blade, means including a shaft for mounting said hub and blade for rotation about an axis to support the aircraft, an inertia element supported for rotation about a spin axis, means supporting said inertia element for universal tilting relative to said shaft to maintain a substantially fixed angular attitude of said spin axis in space, a control device responsive to changes in the angular attitude of said shaft relative to said inertia element substantially in the plane including said shaft and said blade, and means operably connecting said control device to said pitch varying means to vary the pitch of said blade to maintain a predetermined angular relation between said shaft and the plane of rotation of said inertia element.

7. In combination in a direct lift aircraft, a hub, a blade on said hub, means for varying the pitch of said blade, means including a shaft for mounting said hub for rotation about an axis to support the aircraft, an inertia element supported for inclination relative to a spin axis, means to spin said element about said spin axis, means supporting said inertia element for universal tilt relative to said shaft to maintain a substantially fixed angular attitude of said spin axis in space, a power operated jack mounted on said aircraft and out of contact with said inertia element, means operably connecting said jack to said pitch varying means for the actuation thereof, a control device for sensing the tilt of said shaft relative to said element to govern the displacement of said jack as a function of the relative position of said shaft and said inertia element leaving said element substantially free of reaction forces, means operably connecting said shaft to said pitch varying means to establish a predetermined corrective pitch change of said blade upon inclination of said shaft relative to said inertia element when said blade is in substantially the same range of azimuth positions as that in which the tilt occurred, and means to tilt said device relative to said shaft to change the space relation between said inertia element and said device to superimpose another pitch change on said blade.

EDWARD A. STALKER.

REFERENCES CITED

The following references are of record in the file of this patent:

UNITED STATES PATENTS

| Number | Name | Date |
| --- | --- | --- |
| 2,146,620 | Brown | Feb. 7, 1939 |
| 2,165,451 | Carlson | July 11, 1939 |
| 2,368,698 | Young | Feb. 6, 1945 |
| 2,384,516 | Young | Sept. 11, 1945 |